US 9,094,866 B2

(12) United States Patent
Lundh (10) Patent No.: US 9,094,866 B2
(45) Date of Patent: Jul. 28, 2015

(54) METHOD AND RADIO BASE STATION IN A WIRELESS COMMUNICATION NETWORK

(75) Inventor: Peter Lundh, Skärholmen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 10 days.

(21) Appl. No.: 13/982,627

(22) PCT Filed: Feb. 1, 2011

(86) PCT No.: PCT/SE2011/050104
§ 371 (c)(1),
(2), (4) Date: Jul. 30, 2013

(87) PCT Pub. No.: WO2012/105877
PCT Pub. Date: Aug. 9, 2012

(65) Prior Publication Data
US 2013/0324105 A1    Dec. 5, 2013

(51) Int. Cl.
*H04W 4/00* (2009.01)
*H04W 28/08* (2009.01)
*H04W 28/02* (2009.01)
*H04L 12/855* (2013.01)
*H04W 76/04* (2009.01)

(52) U.S. Cl.
CPC .......... *H04W 28/08* (2013.01); *H04W 28/0205* (2013.01); *H04L 47/2466* (2013.01); *H04W 28/0289* (2013.01); *H04W 76/046* (2013.01)

(58) Field of Classification Search
CPC ......... H04L 47/2466; H04W 28/0205; H04W 28/0289; H04W 28/08; H04W 76/046
USPC .......... 455/424, 422.1, 420, 436, 438, 452.1, 455/446, 454, 439, 525, 67.11, 561; 370/230, 331, 332, 328
See application file for complete search history.

(56) References Cited

U.S. PATENT DOCUMENTS

| | | | |
|---|---|---|---|
| 2001/0016494 A1 | 8/2001 | Hayashi et al. | |
| 2004/0147266 A1* | 7/2004 | Hwang et al. | 455/445 |
| 2004/0229626 A1* | 11/2004 | Yi et al. | 455/450 |

(Continued)

FOREIGN PATENT DOCUMENTS

| | | |
|---|---|---|
| EP | 1 691 566 A1 | 8/2006 |
| JP | 2007074210 A1 | 3/2007 |
| WO | 2009057960 A2 | 5/2009 |

OTHER PUBLICATIONS

3GPP TR 25.902 version 6.0.0 Release 6-TI: Universal Mobile Telecommunications System (UMTS); Iub/Iur congestion control ( ); ETSI TR 125 902 PUB:2. AVC meeting; May 23, 1991-May 31, 1991; Paris; (CCITT SGXVexpertgroup for ATM video coding),Sep. 1, 2005, LIS, Sophia Antipolis CEOEX, France, PO: Sep. 1, 2005; abstract AN:XP014032257.

(Continued)

*Primary Examiner* — Babar Sarwar
(74) *Attorney, Agent, or Firm* — Christopher & Weisberg, P.A.

(57) ABSTRACT

The embodiments of the present invention relate to a method and a RBS to reduce the RNC load. This is achieved by letting the radio base station identify RRC connection requests and performing RRC connection rejects. In this way, excessive load of RRC requests done by typically Smart Phones can be rejected in a good way by the radio base station and therefore free up capacity in RNC, making it possible for RNC to execute useful traffic to a higher degree.

20 Claims, 8 Drawing Sheets

(56) References Cited

U.S. PATENT DOCUMENTS

| | | |
|---|---|---|
| 2005/0094558 A1 | 5/2005 | Lu |
| 2007/0142054 A1* | 6/2007 | Sanjeev et al. ............... 455/450 |
| 2009/0082041 A1 | 3/2009 | Ranganathan et al. |
| 2009/0219893 A1* | 9/2009 | Korpela et al. ............... 370/332 |
| 2010/0015987 A1* | 1/2010 | Katori et al. ................. 455/450 |
| 2010/0091651 A1* | 4/2010 | Chin et al. ................... 370/230 |
| 2010/0254279 A1* | 10/2010 | Choi et al. ................... 370/252 |
| 2011/0019633 A1* | 1/2011 | Tajima et al. ................ 370/329 |
| 2012/0163203 A1* | 6/2012 | Wilkinson et al. ............ 370/252 |
| 2013/0035101 A1* | 2/2013 | Wang et al. .................. 455/437 |
| 2013/0088956 A1* | 4/2013 | Zhou et al. ................... 370/230 |

OTHER PUBLICATIONS

International Search Report and Written Opinion dated Oct. 21, 2011 for International Application No. PCT/S32011/050104, International Filing Date: Feb. 1, 2011 consisting of 12-pages.

* cited by examiner

METHOD AND RADIO BASE STATION IN A WIRELESS COMMUNICATION NETWORK

TECHNICAL FIELD

The embodiments of the present invention relate to a method and a radio base station in a wireless communication network for reducing load on a radio network controller which controls the radio base station.

BACKGROUND

Figure 1:
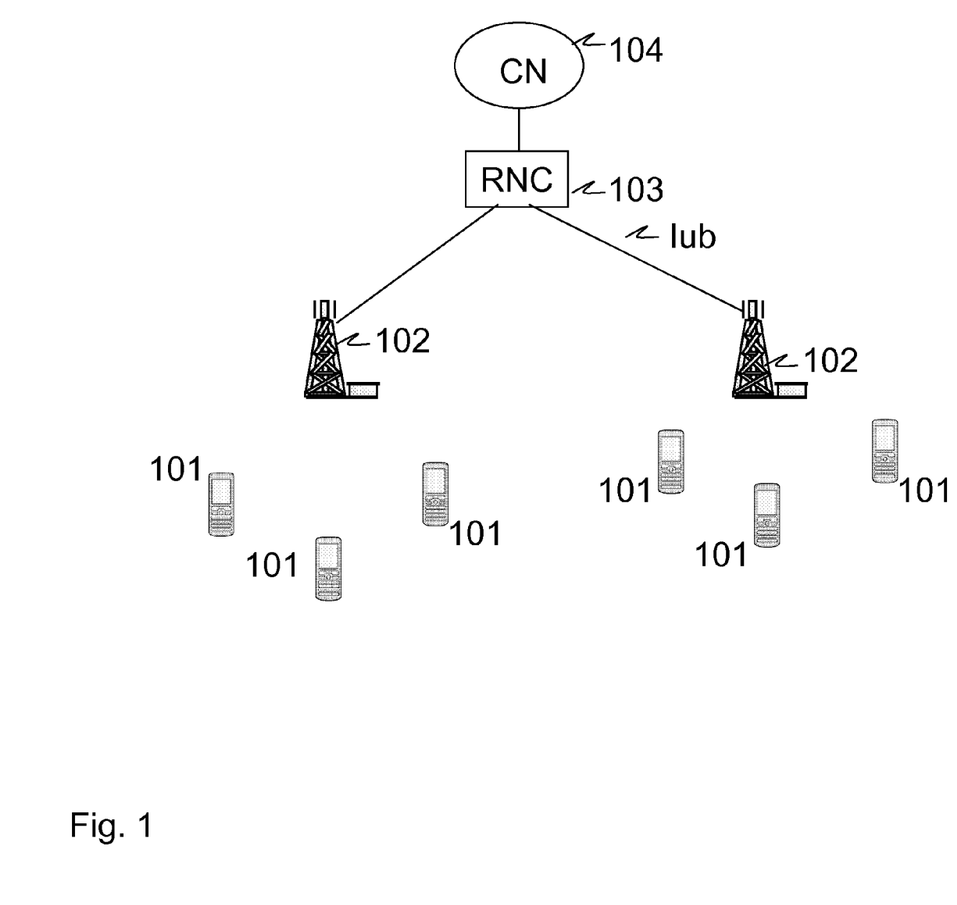
FIG. 1 illustrates a wireless network wherein the embodiments can be implemented.

In a 3G network as illustrated in FIG. 1, radio base stations 102 are controlled by Radio Network Controllers (RNCs) 103. I.e., each RNC 103 controls one or more radio base stations 102. The radio base stations (RBSs) 102 and the RNCs 103 constitute a Radio Access Network (RAN). The RAN is further connected via the RNCs to a Core Network (CN) 104. FIG. 1 also illustrates User Equipments (UEs) 101 communicating wirelessly with one or more RBSs 102.

Figure 2:
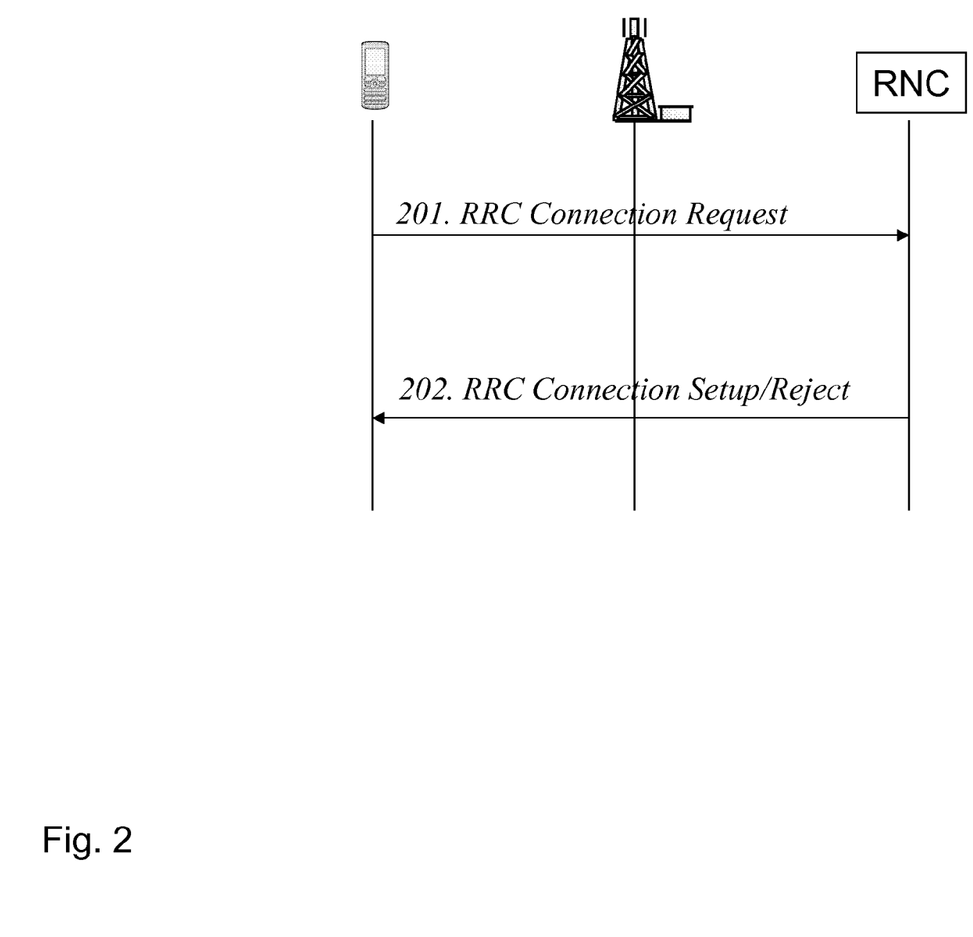
FIG. 2 illustrates RRC signaling according to prior art.

Some of the signaling between the User Equipments and the Radio Access Network (RAN) is transmitted between the UE and the Serving RNC transparently over the radio base stations (RBSs). An example of such signaling is Radio Resource Control signaling. In FIG. 2, an RRC connection request is sent 201 from the UE to the RNC and the RNC responds 202 with a RRC connection setup or reject.

In some scenarios, parts of the RNC get overloaded with huge number of Radio Resource Control (RRC) connection requests from the UEs, typically generated by applications on Smart Phones. When the RNCs are overloaded, they have to spend quite some processing power on just answering RRC connection requests by sending RRC rejections. A smartphone is a handheld device with applications (APPs), which generate traffic in the background, without the explicit knowledge of the user. The applications generate traffic by themselves, polling data bases, positioning updates, etc.

The load on the network nodes increase with the increased number of Smart Phones as the difference between a human being and an application in a Smart Phone is that the application does not give up upon reception of RRC connection reject, which a human being normally does after just a few attempts.

An example of an implementation is to let the RNC reject a certain percentage of the RRC requests that the RNC node can not proceed with. The rejections are done early in the RNC software code, but the RNC still consumes RNC processing power and RRC signaling over the Iub interface with these RRC connection requests and rejections. In the existing solution RRC requests are rejected with a percentage between 0% and 80%, in steps of 10%. The RNC load is evaluated every 5 seconds.

At high RNC load, it is of course devastating to give a further portion of the processing power spent on rejecting RRC connection requests. The higher the excessive load is, the higher is the processing power that the RNC needs to spend on answering RRC connection requests with RRC connection rejections.

SUMMARY

Therefore, a solution is needed which can reduce the load on the RNCs.

According to embodiments of the present invention, this is achieved by letting a radio base station terminate RRC connection requests instead of the RNC and performing RRC connection rejects. In this way, excessive load of RRC connection requests done by typically Smart Phones can be rejected in a good way by the radio base station and therefore free up capacity in RNC, making it possible for RNC to execute useful traffic to a higher degree.

Thus according to a first aspect of embodiments a method in a radio base station connected to a RNC in a wireless communication network is provided. The RNC is configured to be involved in communication with a UE and said communication is sent transparently over the radio base station. In the method, a rejection ratio associated with said communication from the UE to the RNC is received from the RNC, and messages from the UE intended for the RNC is received. A percentage of the received messages from the UE are terminated according to the received rejection ratio, and a response is sent to the UE for each of the terminated received messages.

According to a second aspect a RBS connectable to a RNC in a wireless communication network is provided. The RNC is configured to be involved in communication with a user equipment and said communication is sent transparently over the radio base station. The radio base station comprises an input section configured to receive from the RNC a rejection ratio associated with said communication from the UE to the RNC and to receive messages from the UE intended for the RNC. A processor is configured to terminate a percentage of the received messages from the UE according to the received rejection ratio. The RBS further comprises an output section configured to send a response to the UE for each of the terminated received messages.

An advantage with embodiments of the present invention is that the RNC processing power is reduced when the RNC is overloaded.

A further advantage with embodiments is that the transport network load does not increase with a massive RRC requests overload.

A yet further advantage with embodiments of the present invention is that the RBS load is not increased, as the RRC rejections performed by RBS will not be sent towards RNC and will neither be returned from the RNC.

A yet further advantage with embodiments is that it is possible to use a solution where the RBS can reject with a longer term ratio and RNC can be rejecting a fraction when needed in a shorter term ratio. To save signaling to the RBS, the RNC should not send the RRC Rejection Ratio too often to RBS nodes. Therefore it is sent more seldom, say every 5 seconds or so. Hence, the RNC has a more precise knowledge of the load situation.

DETAILED DESCRIPTION

The embodiments of the present invention are described in conjunction with a 3G wireless communication network and wherein the communication sent between the UE and the RNC, transparently over the RBS, is RRC communication, exemplified by RRC Connection Establishment procedure messages.

However, the embodiments are not limited to 3G networks or RRC communication. Instead the embodiments can also be applicable to other networks with similar architecture and to protocols which originally are sent transparently over one of the network nodes.

Hence, the embodiments of the present invention relates to a method and a radio base station (RBS) in a radio communication network.

In order to reduce the load on the RNC, the embodiments of the present invention provides a solution where the radio base station (RBS) is configured to "sniff" on RRC connection requests from the UEs to the RNC and where the radio base station is configured to reject a certain percentage of the RRC connection requests such that the RNC does not have to process all RRC connection requests. "Sniff" implies that the RBS (or another node) reads a protocol message which is not originally intended for the RBS (or the other node). The percentage of the RRC connection requests that are rejected is referred to as RRC rejection ratio and the RRC rejection ratio is controlled by the RNC.

In this way, the RNC can spend some processing power on adjusting the RRC rejection ratio and send it to the RBS periodically, rather than having to spend processing power on the actual processing of the RRC requests and answering with rejections.

According to the RRC protocol, the RRC messages are sent from the UE to the RNC transparently over the RBS. When an RRC connection request is received by the RNC, the RNC has to process all requests and reply to the UE with a RRC connection reject or RRC connection setup. The RRC connection establishment procedure is illustrated in FIG. 2. This means that the RNC also needs to answer with rejections when the RNC is overloaded, which consumes unwanted RNC processing resources. When an RRC Request fails over the radio interface, i.e. the RNC responds with an RRC connection reject, the UE sends a new request. This is currently standardized to be 15 seconds.

Hence, the RRC rejection ratio is today based on RNC processing load and radio network cell load. When the RRC rejections are done in the RBS according to the embodiments, it also gives the potential for RBS to add further reasons for rejections, e.g. RBS processing load.

The solution can also be combined in a way that RBS rejects a certain percentage and wherein the RNC also has the possibility to reject. This can be useful during a migration phase where only some of the RBS nodes are configured to reject RRC connection requests according to the embodiments, while other RBS nodes are configured according to prior art.

Figure 3:
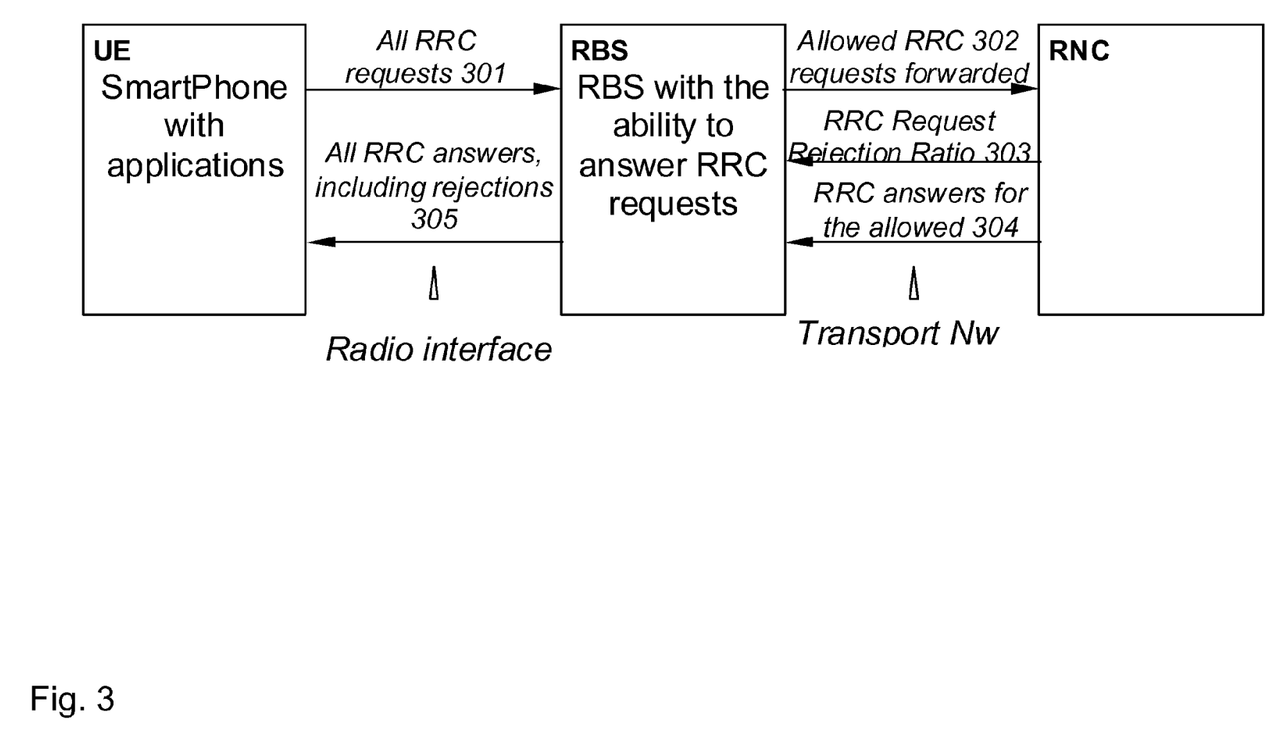
FIG. 3 illustrates RRC signaling according to embodiments of the present invention.

The embodiments are particularly advantageous in connection with smart phones. Hence a UE operated by a human being normally gives up after a few attempts, while an application on a SmartPhone never gives up, e.g. updating e-mails, retrieving a new map, updating a status, etc. This scenario where applications on a smartphone connect to a wireless network is illustrated in FIG. 3. In this embodiment, the UE is a smartphone with applications sending frequent RRC requests. The RBS is configured to sniff all RRC requests 301 from the UE intended for the RNC. The RBS has received 303 a RRC Request rejection ratio from the RNC (e.g. in a NBAP signal Physical Shared Channel Reconfiguring message), and based on that determines which RRC requests that should be forwarded 302 to the RNC and which RRC requests that should be processed in the RBS and be responded with an RRC connection reject 304. The RNC responds 304 to the RRC Connection requests which the RBS forwards 302 to the RNC either with a RRC Connection Setup or RRC Connection reject. All information that the RBS needs in order to send the RRC connection reject is found in the RRC connection request message as explained below.

Figure 4:
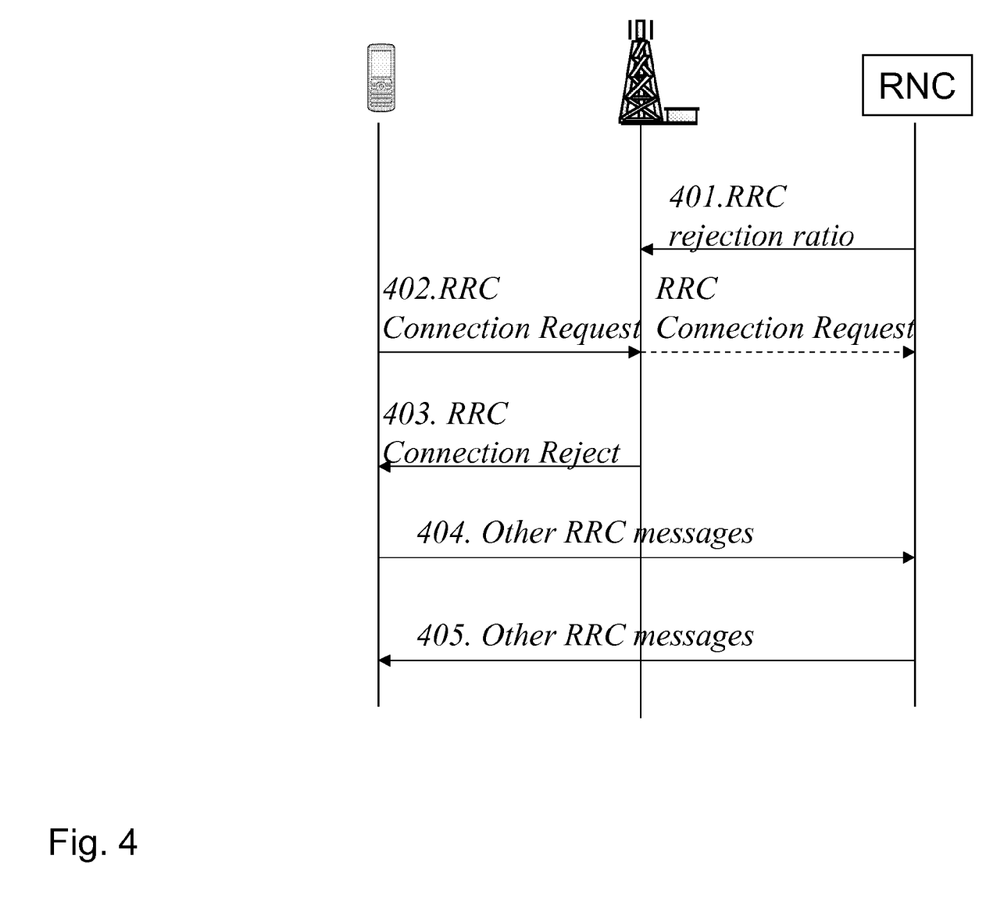
FIG. 4 illustrates RRC signaling according to embodiments of the present invention.

FIG. 4 illustrates an embodiment of the present invention in a more general aspect. The RBS receives 401 information concerning RRC rejection ratio from the RNC. This information can be received periodically, at a certain time instance, triggered by a specific event or upon request. The RBS further receives 402 RRC connection requests which the RBS identify and determine whether the RBS should process the RRC connection request or forward to the RNC. The dashed arrow indicates the RRC connection requests that are forward to the RNC. In the scenario illustrated in FIG. 4, the RBS determines that the RBS should process the RRC connection request and create and send 403 an RRC connection reject to the UE. Other RRC messages are transmitted 404, 405 between the UE and the RNC.

When UE performs an RRC connection request, the RACH channel is used. There is no macro-diversity involved at this stage. The RRC connection request is addressed to one cell only.

The message from the RNC to the RBS concerning the RRC request rejection ratio may be a NBAP (Node B Application Part) proprietary Information Element in an NBAP message Physical Shared Channel Reconfiguring. The RRC Request Rejection Ratio message may be sent to the RBS with regular intervals, or when needed.

When the RNC is overloaded, some types of RRC connection requests may be rejected with higher priority than others. These types of RRC connection requests may be defined in the Information Element "Establishment Cause". Examples of RRC connection requests that may be rejected with lower priority, i.e. which are more seldom rejected, are emergency calls and voice calls. Examples of RRC connection requests that may be rejected with higher priority are PS (packet switched) domain activities, i.e. PS Interactive/Background/Streaming, plus Registration, Non-voice, such as Interactive (e.g. HSDPA users), and low priority users, such as Machine-to-machine signaling.

An existing reject algorithm in the RNC steps the reject percentage figure up or down with 10% every 5 seconds period, or keep it as is. The existing minimum reject ratio is 0% and the existing maximum reject ratio is 80%.

Figure 5:
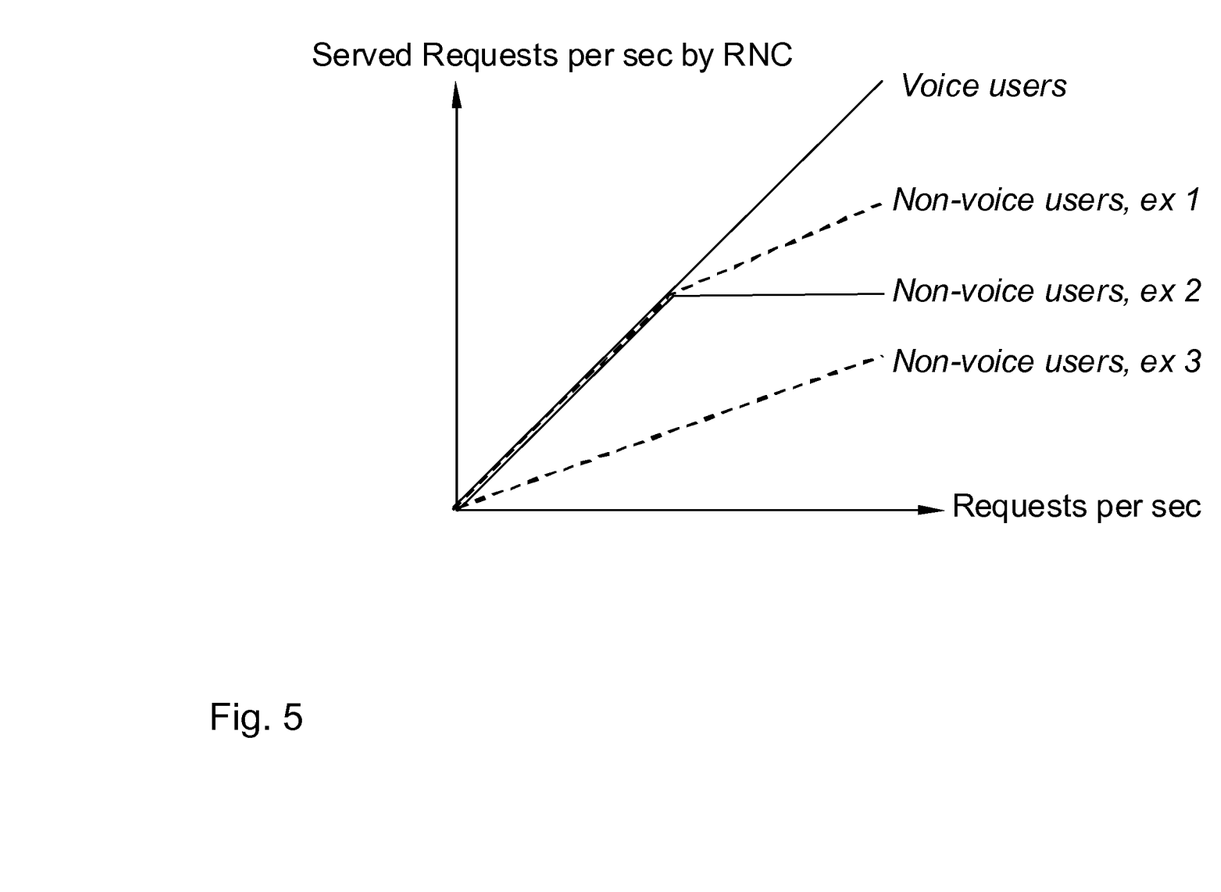
FIG. 5 shows how RRC connection requests can be rejected.

Another solution is also that the RNC serves the percentage of requests per second up to a certain level. As illustrated in FIG. 5, over that certain level, the requests are rejected completely referred to as ex 2, or according to an attenuated line as ex 1 and ex 3. In ex 1 of FIG. 5 a certain percentage is rejected while in ex 3 a certain percentage above a request per second intensity is rejected.

By allowing the RBS to process and reject RRC connection requests and hence implement a reject algorithm in the RBS partly or entirely the RBS can add information to the decisions not available in the RNC node. In existing solutions the RNC uses RNC load and cell load. In the embodiments of the present invention, the RBS can add further information for even better decisions. As explained above, the RBS according to embodiments of the present invention can identify RRC connection request messages. This may be performed according to the following procedure for each RRC message on the Random Access Channel arriving at the RBS:

If the RRC Reject Ratio is bigger than zero, then:

Two bits (in Target Channel Type Field) on the messages arriving on the Random Access Channel (RACH) identify the logical channel. The RRC Connection Requests arrive on the CCCH (Common Control Channel) and the CCCH is identified by 00. Hence filter on "00" in MAC header which indicates the CCCH. Run ASN.1 decoder on CCCH payload and identify RRC Connection Request messages.

Decide if this is RRC Connection Request message shall be rejected in the RBS or be forwarded to RNC in accordance with a reject algorithm and possibly also depending on establishing cause. The RRC Connection request IE (Information Element) "Establishment Cause" may be used to determine which of the REQUESTS that shall be rejected or served. For example emergency calls shall not be barred, while Interactive users shall be barred.

When M2M signaling is introduced with a low priority cause, these shall probably be rejected first, before Interactive, Voice and emergency calls.

If the RRC Connection request message should be rejected, extract and store "Initial UE identity" from the RRC Connection Request message. Hence the RRC Connection request IE "Initial UE Identity" is used as reference in the RRC connection reject message. Further, a RRC connection reject message is created and sent over the radio-interface to the UE as explained below.

If it is determined that the message is not a RRC connection request message or that it should not be rejected according to the reject algorithm and possibly also depending on establishing cause then forward the RRC connection request message to the RNC.

If the RRC Reject Ratio is zero, THEN:

Forward all RRC connection request message to the RNC. In this case no RBS sniffing is needed.

When the RBS has decided that the RBS should reject a RRC connection request message, the RBS is configured to create a RRC connection reject message. This may be performed by the following procedure.

The Message type is generated by an ASN.1 coder.

RRC transaction identifier may be hard-coded to zero.

The same Initial UE identity as found in the RRC connection request message should be used. The following are examples of further parameters in the RRC connection reject message.

Rejection cause: congestion (in this case).

Wait time: 15 sec. (The time until the next RRC connection request message is sent.)

Redirection info: not present.

Counting completion: not present.

The RRC rejection ratio may be determined per cell. When the RBS sniffs RRC requests and performs rejections by its own, a PM counter is needed to support the system with a total RRC rejection counter per cell.

Even if RBS performs a certain rejection ratio, it might happen that RNC performs a further rejection, meaning that the counters for a certain cell in RBS and RNC have to be merged into one logical counter for performance calculations.

Figure 6:
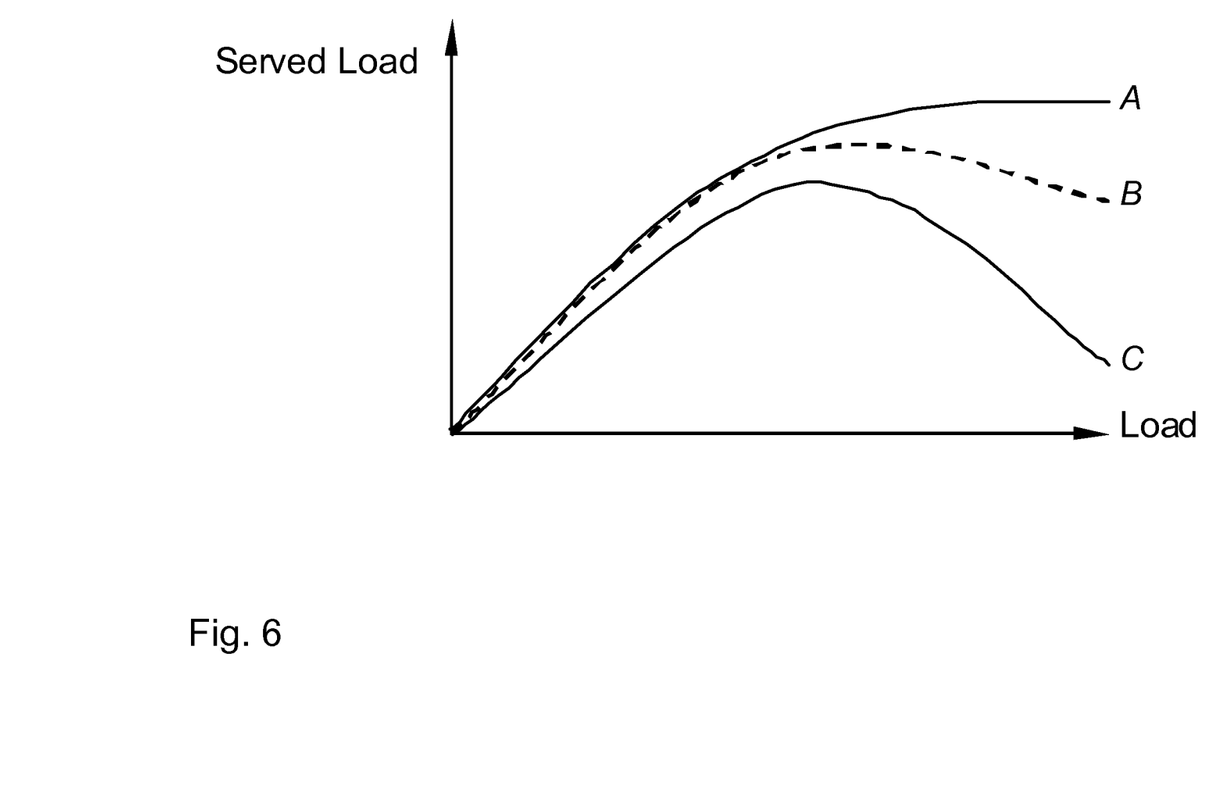
FIG. 6 exemplifies performance degradation in a RNC.

It would be desired if a node such as the RNC can process useful actions to 100% as curve A in FIG. 6, without any degradation. However, that is often not the case, some degradation is normal illustrated by curve B in FIG. 6. However, if the degradation is huge at excessive overload as illustrated by curve C, something must be done.

One solution is to put the overload rejection activities in peripheral devices, such as the RBS nodes in the radio access network. With the solution according to embodiments, the RNC performance can be moved from a behavior according to curve B to a behavior close to the behavior shown by curve A when it comes to RRC processing at excessive load.

Figure 7:
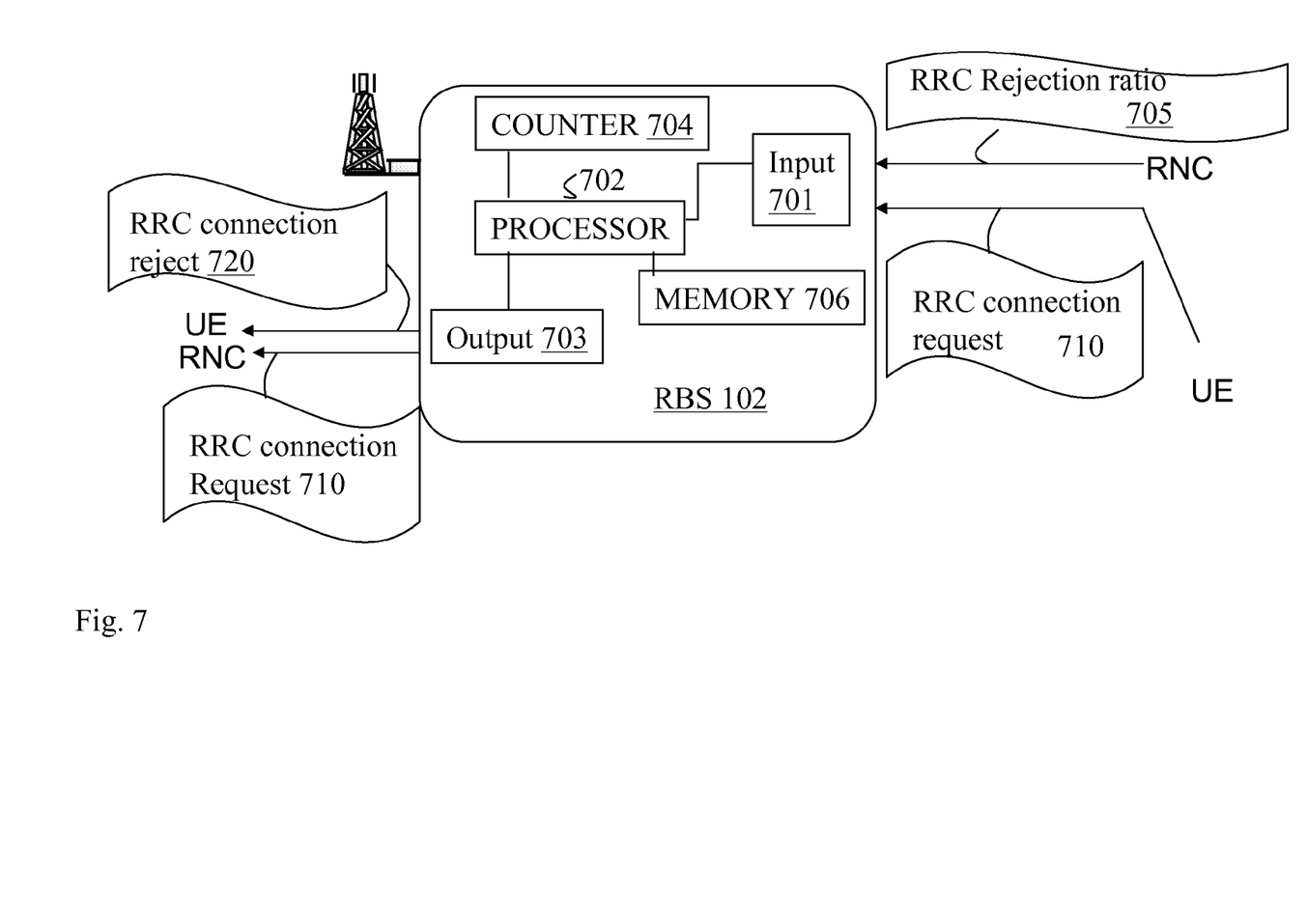
FIG. 7 illustrates a radio base station according to embodiments of the present invention.

Turning now to FIG. 7 showing a radio base station 102 connectable to a RNC in a wireless communication network according to one embodiment. The RNC is configured to be involved in communication with a UE, exemplified by RRC communication. Said RRC communication is sent transparently over the radio base station. The radio base station comprises an input section 701 configured to receive from the RNC a rejection ratio 705 associated with RRC communication from the UE to the RNC and to receive RRC messages 710 from the UE intended for the RNC, a processor configured to terminate a percentage of the received RRC messages according to the received rejection ratio, and an output section configured to send a response 720 to the UE for each of the terminated received RRC messages. It should be noted that the output section 703 is also configured to forward RRC messages to the RNC which should not be processed by the RBS.

Terminating RRC messages implies that the RBS processes the RRC messages, i.e. identifies the RRC message and determines that the RRC message should not be forward to the RNC. Instead the RBS extracts information from the RRC message and creates a reply to the UE.

Further, the RBS may comprise one or more counters 704 to keep track of the percentage of RRC connection requests which are allowed to be forward to the RNC and which are terminated by the RBS. This information may be stored in a memory 706.

It should also be noted that the RNC is configured to send a rejection ratio 705 associated with RRC communication from the UE to the RNC to the RBS.

Figure 8:
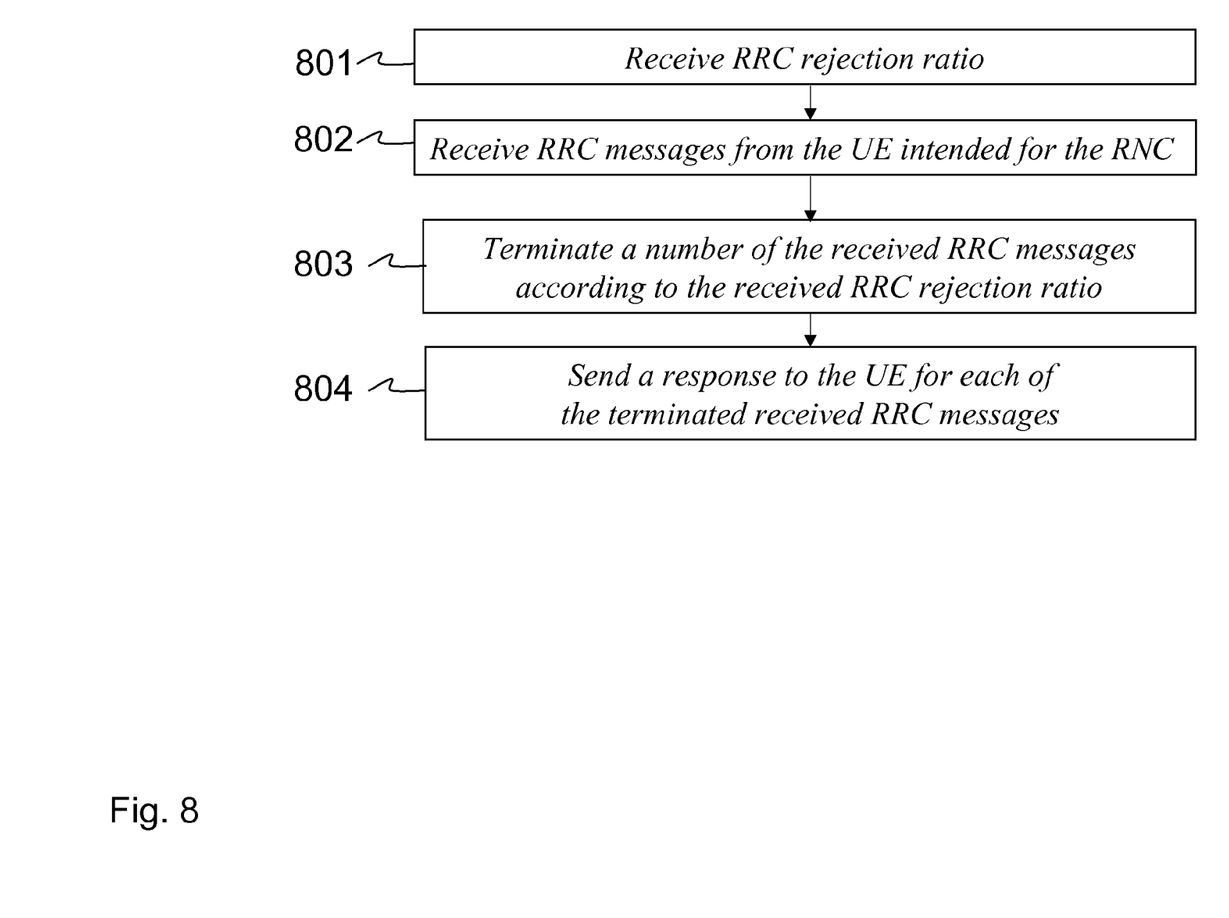
FIG. 8 is a flowchart of a method according to embodiments of the present invention.

Turning now to FIG. 8, illustrating a method in a radio base station connected to a RNC in a wireless communication network according to one embodiment. The RNC is configured to be involved in communication with a UE exemplified by RRC communication. Said RRC communication is sent transparently over the radio base station. In the method, a rejection ratio associated with RRC communication from the UE to the RNC is received 801 from the RNC. Further, RRC messages are received 802 from the UE which originally are intended for the RNC. A percentage of the received RRC messages are terminated 803 by the RBS according to the received rejection ratio. A response is sent 808 to the UE for each of the terminated received RRC messages.

According to an embodiment, the received rejection ratio associated with RRC communication from the UE to the RNC is at least indicative of a percentage of RRC communication that should be rejected.

According to a further embodiment, the received rejection ratio associated with RRC communication from the UE to the RNC is at least indicative of a type or types of communication that should be rejected.

According to one embodiment, the received RRC message is a RRC connection request and the sent response is a RRC connection reject. Further, parameters within the received RRC message may be used for creating the response sent to the UE.

The invention claimed is:

1. A method in a radio base station connected to a radio network controller, RNC, in a wireless communication network, the RNC being configured to be involved in communication with a user equipment, UE, and said communication is sent transparently over the radio base station, the method comprises:

receiving from the RNC a rejection ratio associated with said communication from the UE to the RNC;

receiving messages from the UE intended for the RNC;
terminating a percentage of the received messages from the UE according to the received rejection ratio; and
sending a response to the UE for each of the terminated received messages.

2. The method according to claim 1, wherein the received rejection ratio associated with said communication from the UE to the RNC is at least indicative of a percentage of Radio Resource Control, RRC, communication that to be rejected.

3. The method according to claim 2, wherein said communication between the UE and the RNC is Radio Resource Control, RRC, communication.

4. The method according to claim 3, wherein the received message is a RRC connection request.

5. The method according to claim 4, wherein the sent response is a RRC connection reject.

6. The method according to claim 1, wherein the received rejection ratio associated with said communication from the UE to the RNC is at least indicative of a type or types of communication that to be rejected.

7. The method according to claim 1, wherein said communication between the UE and the RNC is Radio Resource Control, RRC, communication.

8. The method according to claim 7, wherein the received message is a RRC connection request.

9. The method according to claim 8, wherein the sent response is a RRC connection reject.

10. The method according to claim 9, wherein parameters within the received message are used for creating the response sent to the UE.

11. The method according to any of claim 1, wherein parameters within the received message are used for creating the response sent to the UE.

12. A radio base station configured to connect to a radio network controller, RNC, in a wireless communication network, the RNC being configured to be involved in communication with a user equipment, UE, and said communication is sent transparently over the radio base station, the radio base station comprising:
an input section configured to:
receive from the RNC a rejection ratio associated with said communication from the UE to the RNC; and
receive messages from the UE intended for the RNC;
a processor configured to terminate a percentage of the received messages according to the received rejection ratio; and
an output section configured to send a response to the UE for each of the terminated received messages.

13. The radio base station according to claim 12, wherein the received rejection ratio associated with said communication from the UE to the RNC is at least indicative of a percentage of the communication that to be rejected.

14. The radio base station according to claim 13, wherein said communication between the UE and the RNC is Radio Resource Control, RRC, communication.

15. The radio base station according to claim 12, wherein the received rejection ratio associated with said communication from the UE to the RNC is at least indicative of a type or types of communication that to be rejected.

16. The radio base station according to claim 12, wherein said communication between the UE and the RNC is Radio Resource Control, RRC, communication.

17. The radio base station according to claim 16, wherein the received message is a RRC connection request.

18. The radio base station according to claim 17, wherein the sent response is a RRC connection reject.

19. The radio base station according to claim 18, wherein parameters within the received RRC message are used for creating the response sent to the UE.

20. The radio base station according to claim 12, wherein parameters within the received RRC message are used for creating the response sent to the UE.

* * * * *

UNITED STATES PATENT AND TRADEMARK OFFICE
CERTIFICATE OF CORRECTION

PATENT NO. : 9,094,866 B2
APPLICATION NO. : 13/982627
DATED : July 28, 2015
INVENTOR(S) : Lundh

Page 1 of 1

It is certified that error appears in the above-identified patent and that said Letters Patent is hereby corrected as shown below:

In the claims

Column 7, Line 32, Claim 11, delete "any of claim" and insert -- claim --, therefor.

Signed and Sealed this
Nineteenth Day of January, 2016

Michelle K. Lee
*Director of the United States Patent and Trademark Office*